United States Patent [19]

Sinner et al.

[11] 3,872,230
[45] Mar. 18, 1975

[54] METHOD FOR PRODUCING FOOD COMPOSITIONS HAVING A NUT-LIKE TEXTURE

[75] Inventors: Joseph M. Sinner, Bloomington; Edward L. Galle, St. Paul; Joseph F. Kolosky, Minneapolis; Marvin O. Mikkelson, Brooklyn Park, all of Minn.

[73] Assignee: The Pillsbury Company, Minneapolis, Minn.

[22] Filed: Feb. 25, 1974

[21] Appl. No.: 445,695

Related U.S. Application Data

[63] Continuation of Ser. No. 225,943, Feb. 14, 1972, abandoned.

[52] U.S. Cl. .................................. 426/98, 426/250
[51] Int. Cl. ................................................ A23j 3/00
[58] Field of Search .............................. 426/98, 250

[56] References Cited
UNITED STATES PATENTS
2,952,544   9/1960   Durst et al. ........................... 426/98
3,431,112   3/1969   Durst ..................................... 426/89
3,719,497   3/1973   Galle et al. ...................... 426/363 X Primary Examiner—Raymond N. Jones
Attorney, Agent, or Firm—James V. Harmon; Michael D. Ellwein

[57] ABSTRACT

Food products having a nut-like texture e.g., simulated nutmeats, are prepared by forming a homogeneous dispersion comprising a continuous phase composed of a hydrophilic film-former in which is suspended droplets of fat or oil. The film-former can comprise an aqueous protein suspension. The dispersion is mixed under a vacuum. The resulting mixture contains sufficient moisture to give it the consistency of a shape-retaining plastic mass. The plastic mass is formed into a predetermined shape and partially dried to reduce surface stickiness at which time it is cut into pieces. Drying is then continued until the moisture content is reduced below about 5 percent by weight.

11 Claims, 6 Drawing Figures

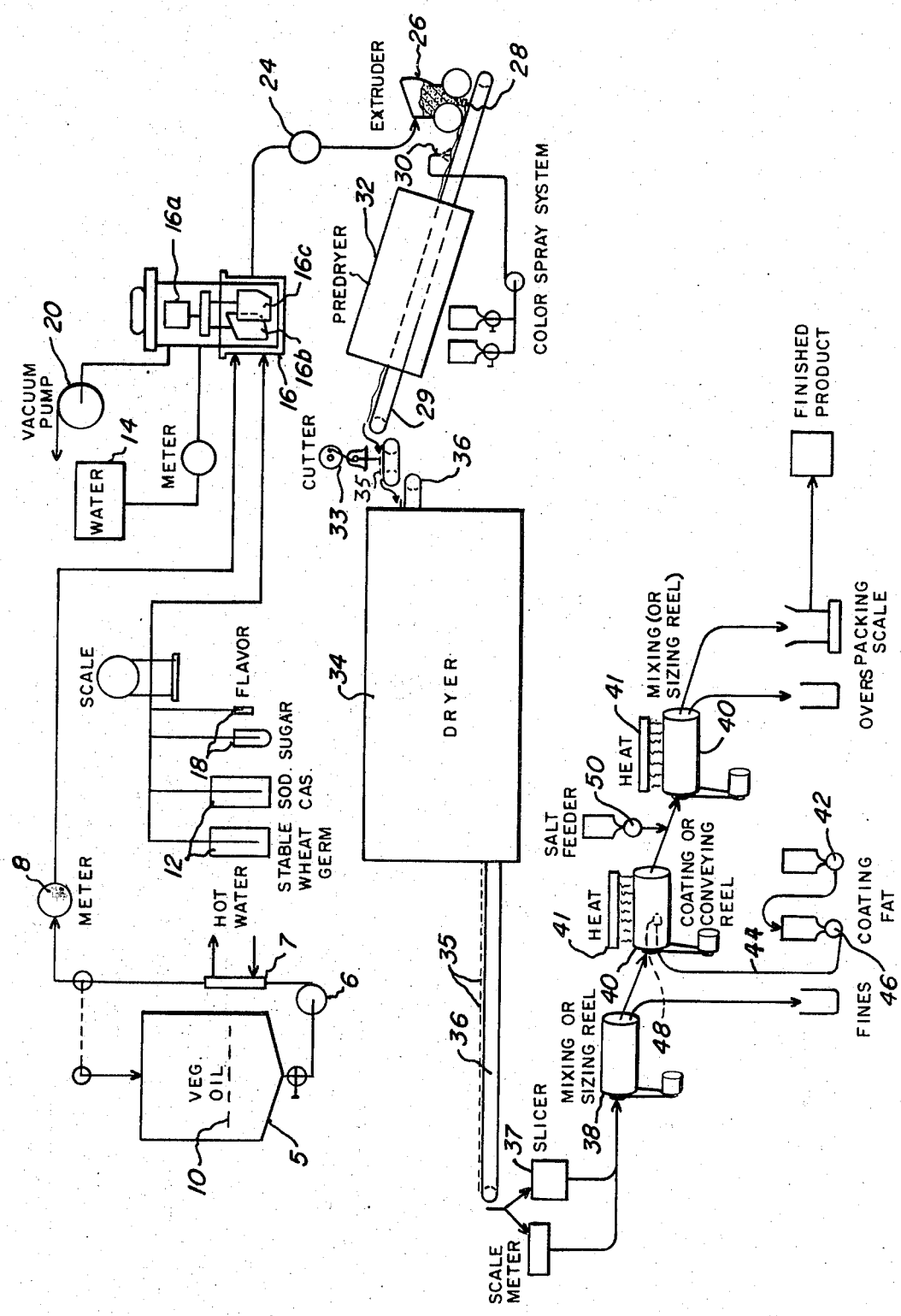

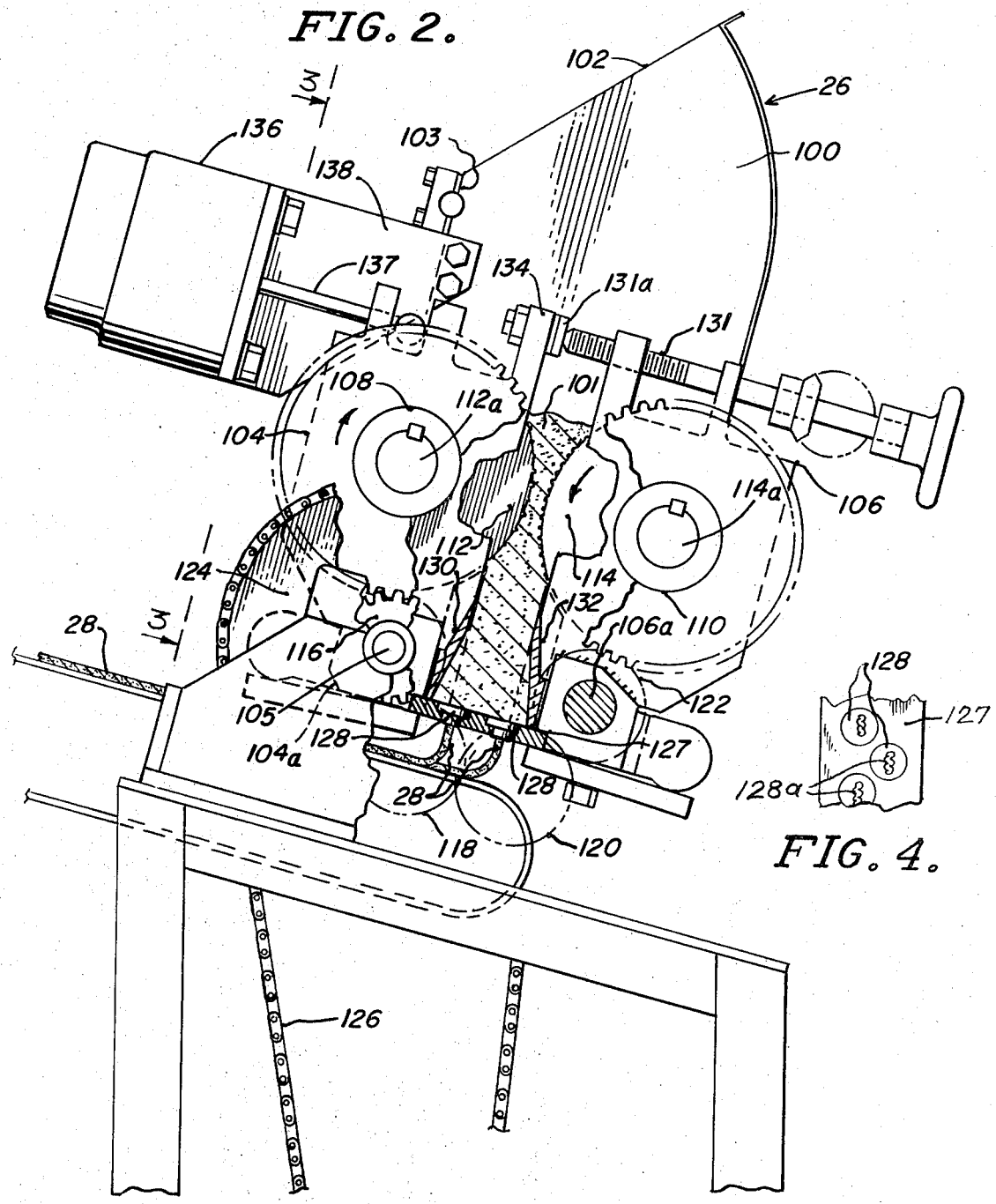

3,872,230

METHOD FOR PRODUCING FOOD COMPOSITIONS HAVING A NUT-LIKE TEXTURE

This is a continuation, of application Ser. No. 225,943, filed Feb. 14, 1972 now abandoned.

FIELD OF THE INVENTION

This invention relates to the production of foods having nut-like characteristics and particularly to food products which have the crunchy, chewing and bite characteristics of nutmeats.

THE PRIOR ART

It has been previously proposed to prepare nut-like products by mixing in slurry form a hydratable film-forming substance with a water immiscible liquid, hydrating the film-forming substance while beating to disperse the water immiscible liquid and form a continuous cellular film thereabout while maintaining the dispersion free from exposure to gas and then slowly drying the cellular film while preserving the continuity thereof. The dispersion can be formed by beating under vacuum to disperse the oil and form a continuous cellular film encapsulating the oil. The vacuum used was at least 10 inches in mercury. A typical drying time was about 12 to 24 hours.

While the process described above has been highly successful, improvements were needed in certain parts of the process. One of the most important disadvantages of the prior process is the lengthy drying time required. A further disadvantage is the lack of control of the oil loss. It has been noted that there is a tendency for oil to be exuded from the finished product which is of course undesirable. It has also been noted by us that when less water is used there is a greater tendency for oil to be exuded or for the product to become oily during shipment, storage or when the pieces are rubbed against one another. A further disadvantage is the tendency for the mixed material to stick to cutting knives used for dividing it into pieces or in an alternative arrangement in which cutting is used at the end of the process, for cutting to break the product into small pieces or fine granules which are too small to be used. A further disadvantage is the tendency for finished pieces to absorb moisture when placed in a moisture containing product such as ice cream and for flavors to be either weak or otherwise not completely acceptable.

OBJECTS OF THE INVENTION

The primary objects of the invention are: (a) to provide an improvement in the drying time and specifically to reduce the drying time for simulated nutmeats from a minimum time of about 12 hours to a total drying time of about 6 hours; (b) to provide a means for reducing the amount of oil loss which occurs during processing and shipment, storage or as a result of the pieces rubbing against one another; (c) provision making possible a reduction in the amount of water contained in the dispersion without causing oil loss in the finished product; (d) a provision for preventing the extruded pieces from sticking to cutting knives and other surfaces; (e) a provision for preventing the production of fines during the cutting operation; (f) a provision for retarding the absorption of moisture into the finished pieces and (g) a provision for assuring the proper concentration of flavor in the finished product.

THE DRAWINGS

FIG. 1 is a schematic flow diagram showing one preferred system for preparing simulated nuts in accordance with the invention.

FIG. 2 is a side elevational view of the extruder partly in section.

FIG. 4 is a partial plan view of the die plate.

SUMMARY OF THE INVENTION

Figure 5:
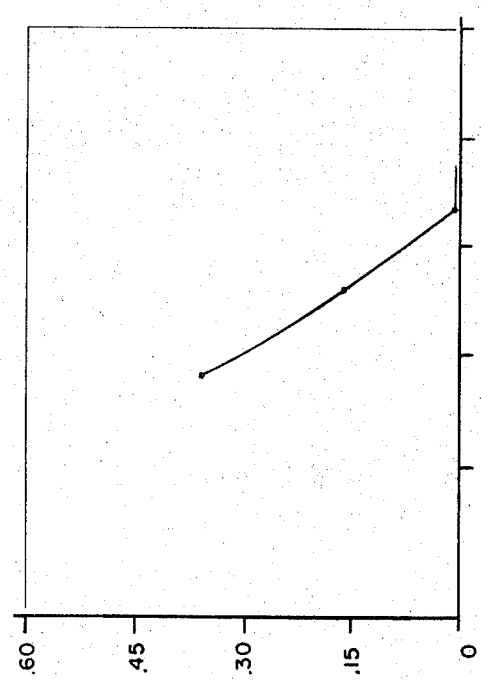
FIG. 5 is a graph showing the effect of vacuum on oil loss.

The present invention concerns a process for preparing foods having a texture of nutmeats by forming a dispersion composed of minute droplets of fat or oil in a continuous phase composed of a hydrophilic film-former such as an aqueous protein suspension, e.g. derived from wheat germ or other edible film-former. The dispersion is mixed under a vacuum or between about 24 inches of mercury gauge and about 29 inches of mercury gauge. At pressures lower than 29 inches Hg, there is a possibility for fat crystals to form in the dispersion. If the pressure during mixing is maintained within these prescribed limits, the oil loss of the finished product i.e., the tendency for an oil film to form on the surface of the finished pieces, will be substantially reduced and the amount of moisture needed to form a stable dispersion without causing excessive oil loss can also be reduced. Thus, providing a vacuum within this range, it was found possible to substantially reduce the amount of water used in the dispersion. Surprisingly however, the finished product has no more tendency to exude oil than those products formed with greater amounts of water.

While the range of pressures that have been found suitable are set forth above, the best performance results are obtained within a narrower range of from about 27.0 inches of mercury gauge to about 29 inches of mercury gauge. With the pressures in this narrower range, the amount of water present can be reduced to about 29 percent by weight. The corresponding drying time for the pieces will be about 6 hours which represents an increase in the dryer capacity by a factor of about 100 percent compared with previously experienced.

The stable dispersion has a plastic shape-retaining consistency. At this stage, it is formed into pieces or strips which are dried in two stages. The first stage of drying is carried to the point where the surface stickiness of the extruded material is reduced. The continuous strips are then cut, for example, by means of an automatic knife into pieces of the desired size. Drying is then continued until the desired amount of moisture has been removed to give the pieces a nut-like chewing texture.

DETAILED DESCRIPTION

To begin the process, oil or fat, water and a hydrophilic film-former are formed into a liquid dispersion composed of an edible film-former as a continuous phase and a discontinuous phase comprising an edible oleaginous substance i.e., oil or a fat which is liquid at the time the dispersion is made. Edible food particles such as flour, sugar, starch or other farinaceous materials in powdered form may be dispersed in the oil, distributed between the encapsulated fat droplets, or if desired, suspended in the film-former. In any event, as a first step in forming the composition of the invention, the edible oleaginous substance is dispersed homogeneously in a continuous phase composed of a polar material; vis., the edible film-former, under conditions which exclude air, preferably under vacuum. The dispersion has a shape-retaining plastic consistency. The plastic product is then formed by molding but preferably by extruding as a ribbon or strip having a defined shape. Water that is present in the continuous phase of the dispersion is removed from the product by drying. Since the moisture is present in the continuous phase, the oil droplets become suspended and encapsulated in the hydrophilic film-former. Upon drying, the oil droplets remain enclosed in the hydrophilic film-former.

The edible oleaginous substance may consist of any edible vegetable or animal oil or fat or mixture thereof, including cottonseed oil, corn oil, wheat germ oil, lard, peanut oil, soy oil, safflower oil, butter, butter oil or margarine.

The oleaginous fraction of the nut product can be from about 10 to 80 percent by weight of the composition with the remaining fraction comprising the film-former on a dry weight basis exclusive of fillers and extenders. To produce different types of nuts, the ratio of oil to other dry constituents can be varied from about 30/70 to 75/25. Water should be present in the finished product in the amount of about 10 percent or less and preferably less than 5 percent by weight for adequate texture and preservation.

The film-former may consist of any edible substance that will form a film around an edible oil using any known process. Examples are: nonfat milk solids, sodium caseinate, soy protein, egg albumen, egg yolk, film-forming substances derived from wheat germ, gelatin, pea flour, bean flour, corn germ, dried whey, gelatinized starch, fish protein, bran protein, gum arabic, and other hydrophilic colloids, such as carboxy-methyl cellulose, agar agar, alginates, guar gum, carboxypropyl cellulose, carrageenin and combinations thereof.

Minor amounts of modifiers can be added to the film-former if desired. Among such modifiers are salts, polysaccharides, such as glucose, sucrose or lactose, polyhydric alcohol, such as glycerin, and other edible food substances, such as starch and the like.

When wheat germ is used, there are sometimes off flavors due to the enzymes present in the wheat germ if the dispersion is dried at lower temperatures such as 140°F. or lower. These lower temperatures are, however, desirable to prevent the volatilization of added flavors during the drying period. The flavor imparing enzymes can be inactivated if the dispersion is dried at temperatures between 170°-190°F., however many of the added flavors are lost if this temperature is held for a substantial period of time.

It has been found that by heating the dispersion to which volatile flavors have been added, to about 180°F. for about 5 to 20 minutes depending on the thickness of the piece, followed by cutting then by continued drying at 170° ± 10°F. for 5 to 8 hours, a number of important advantages are obtained. The elimination of surface stickiness prevents the cutting knives from becoming coated. Oil exudation at cut ends is also reduced. Moreover, it reduces the production of fines which occurs if the ribbons are cut after being completely dried. Moreover, the enzyme activity is destroyed and many flavors that previously evaporated are kept in the synthetic nut.

In tests leading to the development of the present invention, it was discovered that the loss of fat from the final product was affected by several factors in the process. The primary ingredients used in these tests were heat stabilized wheat germ flour, 24.5 percent by weight; vegetable oil 73 percent by weight; sugar 2 percent by weight and flavor, 0.5 percent by weight. Using this formula, tests were conducted in which a number of process variables were changed to determine their effect. It was found that the most important factors were in order of declining importance; first, running the vacuum pump continuously during processing rather than turning off the pump after achieving the proper vacuum; second, prolonging the mixing time (with improved effects being achieved at mixing times up to as much as 40 minutes); third, maintaining the temperature of the slurry during mixing at about 80°F. rather than at a higher temperature such as 100°F. Other factors considered apart from those mentioned above are also important. It has been discovered that lower absolute pressures i.e., higher vacuums reduce fat loss. Thus, as seen by reference to FIG. 5, at a vacuum of 26.94 inches of mercury, the fat loss in the finished product is 0.36 percent by weight. It is reduced to 0.15 percent by weight when the gauge pressure used is reduced to 27.67 inches of mercury. Moreover, the loss is reduced to nill when the vacuum is about 28.0 or more inches of mercury.

Figure 6:
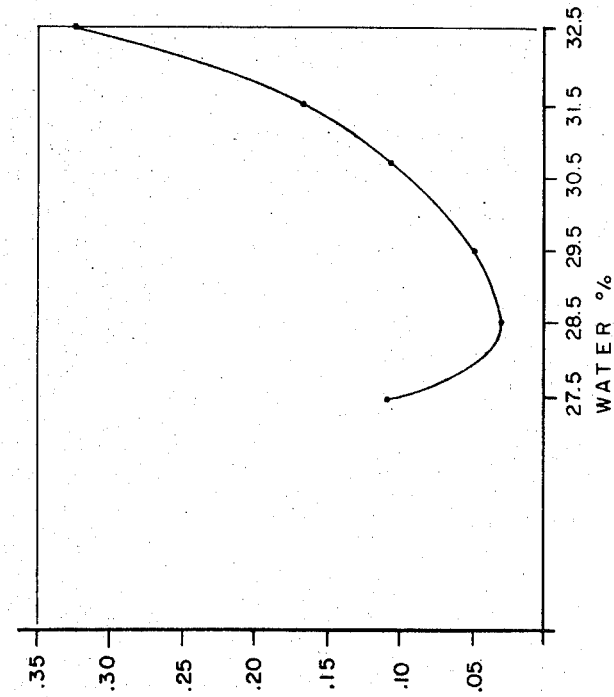
FIG. 6 is a graph showing the effect of water on oil loss.

The water level used in making the dispersion also affects fat loss. The optimum water level is about one or two percent above the minimum amount of water required to form an extrudable dispersion. Water levels beyond this point, however, increase the amount of fat loss experienced. By reference to FIG. 6 it can be seen that while the fat loss is about 0.1 percent at both 27.5 and 30.5 percent water, a minimum fat loss of about 0.025 percent by weight is experienced when the water level is between about 28 and 29.5 percent by weight.

It was found that the amount of water present should be between about 27-30 percent by weight. The mixing time is only that which is necessary to form a dispersion. With the percent of water above about 28.5 percent this can usually be achieved in less than 12 minutes using a mixer manufactured by the Charles Ross and Son Company, Hauppange, L.I., New York, operating at a speed of 1600 rpm's.

It was also discovered that the drying time is significantly affected by the speed of the mixer and that high mixing speed for example an orbital paddle speed of about 83 rpm extends the mixing time significantly compared with an orbital mixing speed of about 67 rpm. It was also found that mixing speeds of substantially less than 67 rpm require more time for the formation of a dispersion.

Concerning the mixing time needed for the dispersion to form, it was found that higher water levels decreased the time required for forming a dispersion. Thus, with a particular formula having a water level of 27.5 percent by weight based upon ingredients other than water, 13 minutes is required for the formation of the dispersion while only 10.5 minutes is required if the water level is increased to 29.5 percent* and only about 7.25 minutes if the water level is increased to 32.5 percent. However, as mentioned above, oil loss in the finished product makes it desirable to use about 28 to 30 percent.

*All percentages herein are on a weight basis of ingredients other than water.

It can be seen that the invention provides a number of important advantages and improvements. Among these is the improvement in color made possible by applying the spray color coating 30 to the outside of the piece. Moreover, water soluble color can be used and the color is effectively protected from bleeding or dissolving, in the event the nutmeats are used in a water containing food product, by the subsequent application of the moisture impervious coating 42.

The pre-drying carried out in pre-dryer 32 conditions the ribbon so that it can be cut without sticking to the cutting device 33 and without fracturing into many tiny pieces as they would if cut after being dried completely. Accordingly, the amount of fines is reduced. It was found that the preliminary drying can be achieved satisfactorily with a typical formulation and ribbon thickness e.g., ⅛ inch in about 20 to 30 minutes at 180°F. using a hot air oven.

It will also be noted that the present invention provides a reduction in total drying time from about 12 hours to about 6 hours. This reduction in drying time results from a number of factors, the primary ones being a reduction in the amount of water used, the amount of vacuum used and the speed of the mixer. The reduction in the amount of water can only be achieved if its relationship to fat loss is understood.

The application of a moisture-resistant coating 42 by tumbling the pieces in a molten plastic fat has proved highly effective in reducing moisture absorption and the bleeding of the sprayed-on color coat. It has also been found a very effective medium for protecting the flavor. A good deal of versatility is also provided by the process with regard to the coating fat that can be used. It should be understood that if the melting point is too low, the pieces will be sticky after storage and if too high, the coating has a tendency to flake off and may give the product a waxy feel in the mouth. It was also discovered that the coating 42 is highly effective for bonding the salt to the pieces after a lengthy storage period.

If a nut flavor is to be used it is applied beneath the coating fat 42, an oil-soluble imitation nut flavor is preferred. It should also be noted that the flavors applied in this manner are not subjected to the heat experienced during the several hours of drying and are prevented from losing their desirable volatile components in this way.

The process is also highly versatile concerning uses to which the finished product may be applied. Outstanding results can be obtained, for example, in preparing simulated nutmeats to be used in ice cream. In this application, it was surprising to find that finished pieces having a moisture content of about 1.5 percent would have a different texture when chilled to the temperature of ice cream (about 0°–15°F.). It was found, however, that the texture of the nutmeats becomes much harder and tougher at this temperature than at room temperature. It was found that by providing a relatively soft or fragile texture at room temperature it is possible to achieve the proper chewing characteristics at the temperature of ice cream.

For the production of simulated nutmeats to be used in ice cream, it was discovered that less protein and more fat should be used. It can be seen from a comparison of Examples I and II that by reducing the protein content by about 6 percent and increasing the fat content by about 5 percent, a change in texture can be achieved to provide especially good results when the pieces are used in ice cream at a temperature which is usually about −15°F.

Refer now to FIG. 1, which illustrates the invention by way of example. Oil 10 stored in container 5 is transferred by pump 6 through heat exchanger 7 to heat it to the desired temperature. It is then fed at a controlled rate by meter 8 to mixer 16. The remaining ingredients, water, wheat germ flour, sodium caseinate, sugar and flavor 18 are then added. Vigorous mixing is begun in vessel 16 to form the aqueous dispersion. Good results are obtained by mixing the oil 10 and a dry powdered film-forming substance 12 first as a slurry. Moisture 14 is preferably added last. Vigorous beating is continued in mixer 14 until the film-forming substances hydrate and coalesce into a continuous cellular phase which isolates and entraps globules of the oil. Alternatively, the oil 10 components may be mixed with the previously hydrated film-forming substances 12. Any other procedure for combining the film-forming and the oil components which will effect the dispersion of the oil component through a continuous phase of the hydrated film-former is also satisfactory.

A vacuum created by pump 20, of between about 24 inches Hg, gauge, and 29 inches Hg gauge is applied to the mixer 16 preferably near the beginning of mixing. The vacuum should be continued to the end of mixing to prevent air entrainment and reduce oil loss.

The vessel 16 is provided with agitator motor 16a connected through suitable gearing to agitator paddles 16b and 16c sweeping the internal side walls of the mixing vessel 16. The mixing is carried out until a homogeneous dispersion is achieved. About 10 to 30 minutes of mixing is usually sufficient. From the vessel 16, the dispersion is transferred by a high-pressure pump 24 to an extruder 26 which produces a ribbon 28 of a defined cross-sectional shape.

The extruder 26 will now be described with particular reference to FIGS. 2 and 3. As seen in the figures, the extruder 26 includes a hopper 100 composed of four mutually perpendicular walls adapted to hold a supply 101 of the dispersion. At the top of the hopper is a cover 102 which is pivotively secured to the top of one sidewall of the hopper at 103. At each end of the hopper are two horizontally and laterally aligned vertically disposed journal plates 104 and 106 only the two on the end closest to the observer in FIG. 2 being shown. Each of the laterally aligned plates 104 is provided with a lower extension 104a which is journaled for pivotal movement upon a stationary trunnion shaft 105 that extends from one side of the extruder to the other. An actuator 136 rigidly supported on the extruder 26 by means of bracket 138 is provided with a reciprocating actuator shaft 137 which is engaged with the top of the plate 104 to thereby pivot plate 104 to the left or right as seen in the figure about shaft 105.

Journaled for rotation in the laterally aligned plates 104 is a drive roll 112 which is itself affixed to a roll shaft 112a that extends through and is journaled for rotation within each of the supporting plates 104. Rigidly connected to the roll shaft 112a is a drive gear 108 that is mounted in driving engagement with a train of gears including a gear 116 (mounted upon the trunnion shaft 105), gears 118 and 120 both of which are mounted for rotation upon a suitable supporting framework and a gear 122 which is journaled for rotation upon a trunnion shaft 106a affixed rigidly to both the plates 106. The gear 122 is, in turn, connected in driving engagement with a drive gear 110 which is rigidly affixed to the roll shaft 114a of a drive roll 114 positioned parallel to the roll 112. In a typical application, roll 114 is spaced from the roll 112 by about 0.01 inches. The spacing between the rolls is maintained by an adjustment screw 131 threaded through the top of the plate 106 closest to the observer and having its end positioned in abutting engagement at 131a with a stop 134 which is affixed to the top of the plate 104.

A sprocket 124 is also mounted upon the shaft 105 and is rigidly fixed with reference to the gear 116. A drive chain 126 entrained over sprocket 124 is suitably connected to a drive motor (not shown). Mounted in engagement with lower surfaces of the rolls 113 and 114 are laterally extending vertically disposed parallel scraper blades 130 and 132. The blades 130 and 132 are suitably mounted in the position shown so that material carried downwardly by the rolls 112 and 114 will be scraped from their surfaces as the rolls rotate thereby driving the accumulated material downwardly between the blades. The dispersion which is at this point a shape-retaining plastic mass is forced downwardly by the rolls 112 and 114 into contact with and through a die plate 127. The die plate 127 is positioned horizontally and extends laterally of the apparatus between the blades 130 and 132. The die plate 127 is provided with plurality of circular dies 128 each having an opening 128a with a cross-sectional shape somewhat resembling the cross-sectional shape of a natural nut is best seen in FIG. 4.

The operation of the extruder 26 will now be described. It will be assumed first that the motor is started and drive chain 126 is turning sprocket 124 in a counterclockwise direction as seen in FIG. 2. This will in turn drive the gears 116 and 120 and 110 in a counterclockwise direction. Gears 118, 122 and 108 will turn in a clockwise direction thereby driving the feed rolls 112 and 114 in the proper directions to force the dispersion downwardly between the scraper plates 130 and 132 into engagement with the die 128 in the die plate 127. The plastic mass will then be extruded as ribbons 28 which are carried toward the left as seen in FIG. 1 by a suitable belt conveyor 29. As mentioned above, the screw 131 is used to control the spacing between the feed rolls 112 and 114. When the apparatus is to be cleaned, the actuator 136 is operated so as to force the actuator rod 137 toward the left in the figures thereby pivoting the roll journal plates 104 and the roll 112 toward the left as seen in the figure about the shaft 105.

Figure 3:
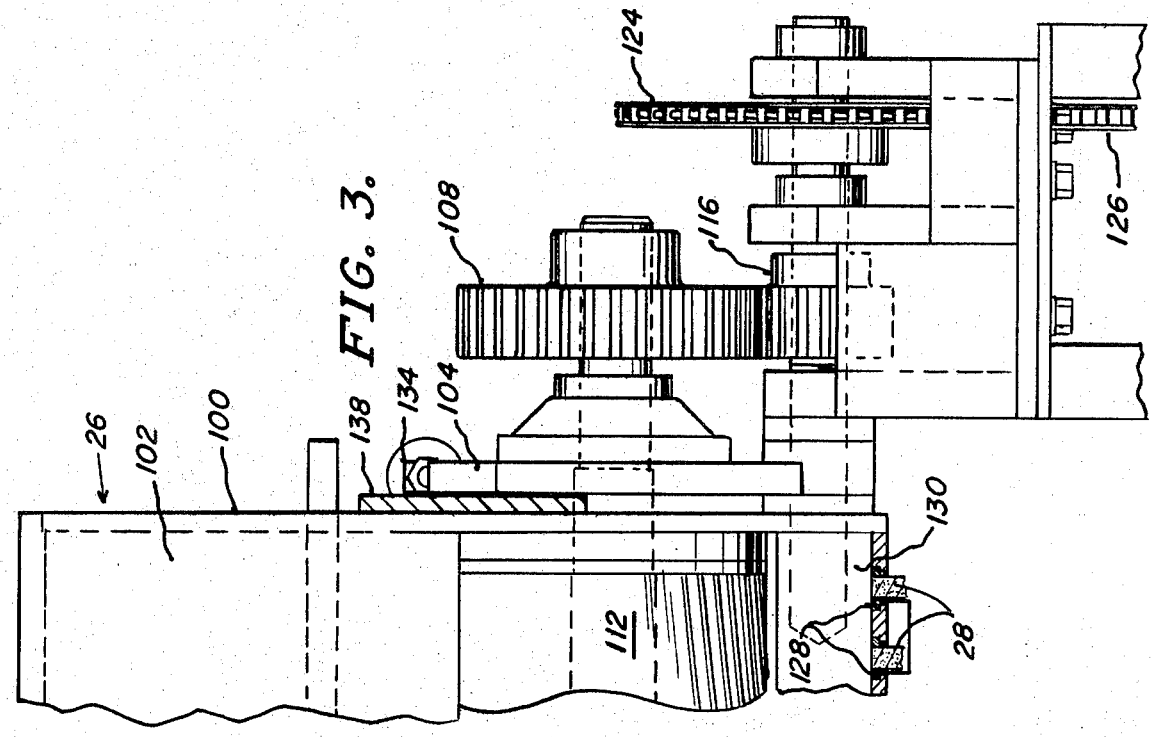
FIG. 3 is a sectional view taken on line 3—3 of FIG. 2.

As can best be seen in FIG. 3, the rolls 112 and 114 are provided with longitudinally extending spirally oriented teeth. The teeth may be inclined at a slight angle with respect to a tangent to the edge of the roll which intersects one edge of one of the teeth. In one embodiment of the invention suited for delivering 400 pounds of dispersion per hour to the dryer the rolls had a diameter of 8½ inches and a length of 37¾ inches. The rolls 112 and 114 were rotated at 1¾ rpm. The surface of each tooth is set at an angle of about 72° with respect to a radius extending through its edge.

The die opening in die 128 produces a ribbed pattern on both the upper and lower surfaces of the simulated nutmeat. The resulting sliced pieces are almost indistinguishable from real sliced nutmeats. The ribbon 28 which is about one-eighth inch thick is coated with color by spray nozzles 30 and passes to pre-drier oven 32 where it is heated to about 180° ±10°F. preferably for about 5 to 10 minutes to reduce the surface stickiness. The ribbon is then cut traversely by knife 33 at intervals of about ⅛ to 2 inches as desired. The ribbon then passes to a large conveyorized drier 34 for about 5 to 10 and typically about 6 hours at 170° ±10°F. which reduces the moisture content to below about 10 percent and preferably below about 3 percent and causes the product to become brittle.

Other forms of drying can be used, such as microwave drying. Generally, if the pieces are subjected to conditions of temperature above the boiling point of water, the pieces will puff and no longer resemble nutmeats in texture.

While the preliminary drying in predrier 32 reduces surface tack and allows the ribbons to be cut without fouling the cutter, the final drying in drier 34 converts the plastic pieces 38 to hard, dry crunchy pieces 35 that have the desired nut-like bite characteristics followed by the smearing sensation of real nutmeats and simulate almost precisely the texture and chewing characteristics of nuts.

Dispersing the oil component throughout the continuous phase of hydrated film-former results in a gel-like mass which slowly dries with the oil globules in situ whereby the hydrated film-former is gradually dehydrated without displacing any of the oil. If steam or oil vapor pressure is created through the application of too high a temperature during drying, the cellular structure will rupture and the oil particles will coalesce and bleed from the product. Hence, the drying is conducted over a relatively greater period of time, e.g., in as little as 5 or 6 hours up to 20 hours.

If the ingredients are selectively employed, the finished product will simulate nutmeats and even particular varieties of nutmeats.

From drier 34 the pieces travel optionally, e.g. via conveyor 36 to a slicer 37 when pieces of very small size are needed. They then pass through a rotating screen sieve 38 where undersize particles are removed or flavor is added. Alternatively the pieces enter a rotating metal cylinder 40 heated by heater 41 sufficiently to bring the cylinder 40 to a temperature above the congealing temperature of the coating fat 42 e.g., about 125°F. The moisture-retarding coating 42 is supplied through a line 44 by pump 46 to nozzle 48. The coater 40 thus bathes the surface of each piece with a melted coating 42 of any suitable kind such as beeswax, zein, mono or di-glycerides or edible shellac or the like. This coating is applied over the entire surface of each cut piece to thereby produce chunks or pieces having color on all sides except those where the cuts were made and a moisture-retarding coating on all surfaces including the cut ends. In this way the cut pieces 35 are made to resemble cut nutmeat pieces very closely.

Any suitable, commercially available nut flavor or in the alternative, some other flavor such as chocolate, fruit, etc. can be added in the required amount in mixing drum 38 to impart the desired flavor and aroma. In the event piece sizing is needed the drum 38 is replaced with a cylindrical sizing screen. The flavor is very advantageously applied after drying and before coating 42 rather than in the dispersion itself. If desired, the flavor may be used in both the coating and the dispersion.

The edible coating 42 will protect the pieces from becoming soggy or soft, especially when the nutmeats are to be used in other food products such as ice cream. The coating 42 is then dried conventionally if necessary. If salt or other seasoning is to be added it is metered onto the pieces at 50. The pieces then pass into a salt coater comprising another cylinder 40 to which heat is supplied by a second heating unit 41 sufficient to raise the temperature of the cylinder above the congealing temperature of the coating fat 42 (e.g. about 125°F.).

It was found that mixing the dispersion in a vacuum of from 24 to 29 inches Hg gauge produces a product that can be made less susceptible to exuding oil with a given amount of water in the dispersion. Conversely, a satisfactory product can be made using less water in the dispersion when a vacuum is provided.

purposes of this invention by warming them above the melting point but not to a temperature which would denature, char or burn any of the associated components.

A large number of hydratable film-forming substances have been utilized in practicing the invention, all of which substances show utility and demonstrate the wide application of the invention. Similarly, a number of oils and melted fats have been experimentally utilized together with various combinations of film-formers. In each case, the novel gel-like dispersion was produced in stable form and then, in turn, was dried to produce the nut-like product. Further, the proportions of the components were varied widely. The oil portion was varied from 25.0 to 85.0 percent, while the hydratable film-former varied from 1.5 to 32.0 percent of the gel-like dispersion. Filler material 18 such as sugar, starch, gums, flavor etc. is added in proportions up to 40 percent and the water is varied from 13.5 to 67 percent. It should be noted that gums and some starches can serve as the film-former if hydrated. However, if they remain in particulate form they act as a filler.

The examples have been selected as showing the wide application of the invention:

SIMULATED NUTMEAT FORMULATION
(Ingredients Other Than Water Percent By Weight)

| COMPONENT | EXAMPLE I<br>Ready to Eat Product | EXAMPLE II<br>Formula For Ice Cream |
| --- | --- | --- |
| Wheat Germ Flour (heated)** | 22% | 24% |
| Partially hydrogenated veg. oil (clears at 65°F–70°F)* | 68 | 73 |
| Sugar | 2.5 | 2 |
| Flavor | 1.5 | 0.5 |
| Sodium caseinate | 6 | — |
| | 100% | 100% |
| Water | 38% | 29% |
| Color (.75% Soln) | 0.6 | 0.6 |

*E. G. Durkee 500, Durkee Fine Foods Division SCM Corporation, Chicago, Illinois
**Prepared as described in application SN760,745 filed September 12, 1968 now Pat. No. 3,783,164

A great improvement is obtained in the intensity and quality of the flavor sensation perceived when volatile flavors are utilized if the flavor is placed on the surface of each piece just under the coating 42.

Among the many variations that may be made in the inventions, it has been found that any hydratable film-forming edible substance can be employed and that the film-formers may be intermixed and proportioned. Fillers can be added thereto at any stage of the mixing process for altering the flavor and texture of the ultimate product without changing the character of the physical structure or the procedure by which such structure is obtained. In some instances, a hydratable film-former can be employed naturally having a filler portion which does not interfer with the proteinaceous portion in producing a cellular structure, but, at the same time, may provide a nutty flavor. Such film-former is exemplified by comminuted wheat germ. Other solid and liquid fillers and modifiers such as sugar and glycerine may be employed without disturbing the basic procedure.

Respecting the oil component, any edible fat or oil may be employed provided it is in liquid condition when dispersed throughout the gel-like mass.

Thus, it is possible to use fats which are plastic at room temperature but which can be made suitable for Processing conditions for Example II is as follows: The temperature of the oil at the time it is placed in the mixer is 95°F. The water temperature is 55°F. The mixer is operated at an orbital speed of 48 rpm and a vacuum of 28 inches of mercury gauge is applied. Mixing is continued for about 10 to 15 minutes until a dispersion forms. After the dispersion forms, mixing is continued for 20 minutes. The dispersion is then placed in extruder 26 and expelled at the rate of 6.5 pounds per minute through dies of an appropriate shape having a width of five-eighths inches and a thickness of one-eighth inches. Preliminary drying is accomplished for a period of about 7½ minutes at 180°F. to dry the color 30 sprayed onto the surface of the strips. The material is then sliced transversely at one-fourth inch intervals and thereafter dried for 6 hours at 170°F. It is then cooled by blowing cooled air on the product to about 90°F. Nut flavoring is added and coated in coater 40 with a continuous coating of hydrogenated vegetable oil 42 at a temperature of 150°F.

Processing of Example I is the same as II with the following changes. Half of the water is added to the other components and mixing is continued for 15 minutes. The other half of the water is added while continuing to mix until a dispersion forms (about 2 to 10 minutes). The remainder of the process is the same except for drying which is 8 hours and no coating is used. The product is not cooled.

The formulation for the finished pieces from Example II is shown in the following table.

| Components | Percent by Weight |
|---|---|
| Dried Finished Pieces (Plain uncoated) | 90.90 |
| Coating 42 | 4.55 |
| Imitation Pecan Flavor | .91 |
| Salt | 3.64 |
| | 100.00 |

What is claimed is:

1. A process for making a nut-like product which comprises intermixing about one part by weight of a hydratable film-forming substance comprising heat stabilized wheat germ flour, about three parts of an edible water immiscible oil and from about 13.5–67 percent by weight water, beating for a period of time sufficient to disperse the water-immiscible oil and cause the film forming substance to coalesce into a continuous cellular phase which isolates and entraps globules of the oil while maintaining the dispersion at a vacuum of between about 24 and 29 inches of Hg gauge and then slowly drying the cellular film in two stages while preserving the continuity thereof.

2. A process for making a nut-like product which comprises; forming a dispersion of a hydratable film-forming substance, a water-immiscible liquid which is in continuous phase and from about 27 percent to 30 percent by weight water and beating for a period of time sufficient to disperse the water-immiscible liquid in the hydrated film-forming substance and cause the film-forming substance to coalesce into a continuous cellular phase which isolates and entraps globules of the water-immiscible liquid while the mixture is subjected to vacuum of between about 24 and 29 inches of Hg gauge, drying the converted dispersion without destroying the continuity of the film for sufficient time to reduce surface stickiness, subdividing the dispersion into pieces and drying the resulting pieces to a moisture content of less than 10 percent by weight.

3. The process of claim 2 wherein said vacuum is applied and the vacuum pump is run continuously during mixing to reduce fat loss from the finished product.

4. A process for making a nut-like product which comprises intermixing one part by weight wheat germ flour to provide a hydratable film-forming substance, about three parts of water-immiscible edible vegetable oil and from 27–30 percent by weight of water while beating for a period of time sufficient to disperse the oil and form a continuous cellular film of the hydratable film forming substance thereabout while maintaining the dispersion at a pressure of about 28 inches of Hg or less, heating said nut-like product at a temperature of at least about 170°F. for at least about 5 minutes to reduce surface tack, cutting the product into pieces and slowly drying the cellular film while preserving the continuity thereof and applying a moisture insoluble edible coating thereto.

5. The process of claim 1 for making a salted nut-like product wherein a plastic fat coating and salt is applied to the product and said fat is allowed to harden to obtain a strong bond between the salt and the product.

6. The product prepared by the process of claim 4.

7. The product prepared by the process of claim 2.

8. The process of claim 1 wherein a fraction of the water is added to the other components, said vacuum is applied and the film-former, the liquid and said water fraction are mixed, thereafter the remaining fraction of the water is added while continuing to mix until a dispersion forms.

9. The product prepared by the process of claim 1.

10. The process of claim 1 wherein a fruit flavor is incorporated into said nut-like product.

11. The process of claim 1 wherein the cellular film is slowly dried at a temperature of between about 170° to 190° F.

* * * * *